Aug. 6, 1968    J. S. OLCOTT    3,395,998
METHOD FOR PRODUCTION OF GLASS ARTICLE HAVING
INCREASED MECHANICAL STRENGTH
Filed Dec. 18, 1964    2 Sheets-Sheet 1

INVENTOR.
Joseph S. Olcott
BY *Milton M. Peterson*
ATTORNEY

United States Patent Office 3,395,998
Patented Aug. 6, 1968

3,395,998
METHOD FOR PRODUCTION OF GLASS ARTICLE HAVING INCREASED MECHANICAL STRENGTH
Joseph S. Olcott, Painted Post, N.Y., assignor to Corning Glass Works, Corning, N.Y., a corporation of New York
Filed Dec. 18, 1964, Ser. No. 419,307
5 Claims. (Cl. 65—30)

ABSTRACT OF THE DISCLOSURE

In this invention, an alkali silicate glass article wherein the principal alkali ion is large is contacted with alkali ions which are smaller than said principal alkali ion at a temperature above the strain point of the glass to cause the replacement of at least a part of the principal alkali ions in a surface layer on the glass with said smaller ions. The article is then cooled below the transformation range thereof and exposed to a temperature between 200° C. and the transformation range to cause an exchange to occur between the smaller ions in the surface layer and said larger alkali ions from the interior part of the glass to thereby produce a surface compression layer in the article.

---

Figure 1:
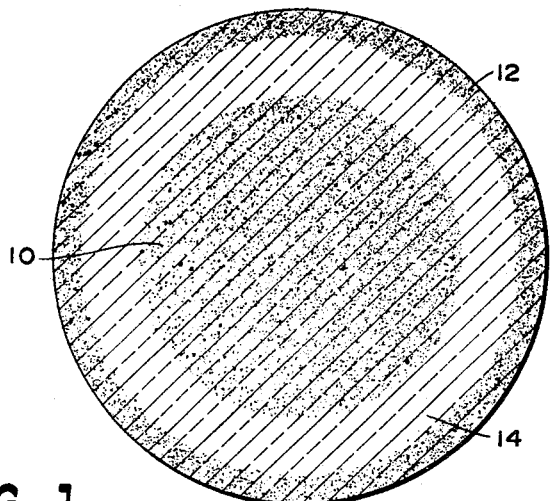

United States Patent No. 2,779,136, granted to H. P. Hood and S. D. Stookey, teaches that an alkali metal silicate glass article, composed essentially of 45–80% $SiO_2$ and 7–25% $Na_2O$ and/or $K_2O$, can be strengthened by exchanging lithium ions from a molten lithium salt bath for sodium or potassium ions from the glass at a temperature between the strain and softening points of the glass. The patent further teaches that, if the glass contains 7.5–25% $Al_2O_3$ and $TiO_2$, the former may combine with $Li_2O$ and $SiO_2$ during the ion exchange to form beta-spodumene crystals in the surface layer. This substantially increases the degree of strengthening attainable.

This chemical strengthening method is quite satisfactory in many respects, but has one seriously limiting feature. In order to achieve an abraded strength over about 25,000 p.s.i. by this method, it is necessary to form beta-spodumene crystals. This normally renders the article substantially non-transparent thereby nullifying or seriously interfering with many applications for glass articles.

More recently, another glass strengthening technique has been discovered wherein relatively large ions are exchanged for smaller ions in a surface layer on a glass article to induce compressive stress. In contrast to the Hood-Stookey method, which must be carried out above the glass strain point, this latter technique must normally be carried out below the strain point of the glass to avoid viscous flow and stress release within the article.

This lower temperature technique of chemical strengthening is particularly desirable because glass transparency and dimensions are normally unaffected by the treatment. However, it has been found that the increased strength imparted by such treatment is rather quickly lost when an article is subjected to temperatures of 300° C. and above for extended periods of time in subsequent service. Also, a serious loss in chemical durability of the glass surface may result from the ion exchange treatment.

A companion application, filed of even date herewith in the names of R. A. Eppler and H. M. Garfinkel and assigned to a common assignee, discloses a double ion exchange method of chemical strengthening. In that method, a glass article is first encased in a layer of a lithium silicate type glass by exchanging lithium ions for larger alkali metal ions from the glass article. The article thus formed is then further strengthened by exchanging lithium ions from the encasing surface glass layer for larger alkali metal ions from a salt bath at a temperature below that at which stress is rapidly relieved. The resulting article is characterized by favorable strength retention characteristics at temperatures up to about 500° C. However, this method has the apparent disadvantage of two separate salt bath treatments with the accompanying expense and inconvenience.

I have now discovered that the double ion exchange principle can be applied in a way that obviates this disadvantage while still providing high temperature strength retention characteristics. In accordance with my discovery, the strength of a glass article encased in a surface layer of a lithium silicate type glass may be substantially increased by maintaining the article at an elevated temperature below the glass transformation or annealing range. This heat treatment does not involve further contact with ion exchange material, but may simply be carried out in ambient air in any convenient oven or kiln. An article thus produced may have strength retention characteristics at high temperatures corresponding to those of a similar article produced by the double exchange method of Eppler and Garfinkel.

Analytical evidence indicates that the further heating step causes a counter diffusion or migration of alkali metal ions to occur within the glass article. Larger alkali metal ions from the parent glass in the article interior migrate outwardly in exchange for lithium ions from the synthesized surface layer on the article. The latter migrate deeper into the article in the exchange. Thus, the glass of the central or core portion of the article, rather than an outside source such as a salt bath, provides a reservoir of larger alkali metal ions for exchange with the lithium ions in the surface layer.

My inventive method then is a method of chemically strengthening an alkali metal silicate glass article wherein the primary alkali metal ion of the glass is relatively large, the method comprising a first step of introducing a smaller alkali metal ion, such as the lithium ion, into an outer zone on the glass article in exchange for the alkali metal ion of the parent glass, the exchange being effected at a temperature above the strain point of the glass to thereby produce a surface glass layer differing in composition and glass structure from the parent glass, and a second step of further heating the resulting glass article at a lower temperature to effect an exchange between the larger alkali metal ion from the parent glass in the inner portion of the article and the smaller ion (e.g. lithium) from the synthesized zone of surface glass without substantial rearrangement of the glass structure and stress relaxation. The invention further contemplates the resulting glass article subsequently described in greater detail.

The invention is hereafter described with respect to the lithium-sodium embodiment wherein lithium ions are initially introduced into a surface layer on a sodium silicate glass and are subsequently exchanged with sodium ions from the inner portion of the article by heat treatment. It will be understood, of course, that the invention is not so limited, but rather may employ any pair of alkali metal ions having a corresponding ionic size differential. For example, sodium ions might be exchanged for potassium ions in a potassium silicate glass above the strain point of the glass, and the article thereafter heated below the glass strain point to effect an exchange of potassium ions from the inner portion of the glass with sodium ions from the surface layer. However, the high mutual diffusivity of lithium and sodium ions, together with the low cost and favorable melting characteristics of soda glasses, makes this the preferred embodiment of the invention.

A glass article of desired shape is formed from a soda glass composed essentially of silica and sodium oxide as the primary alkali metal oxide. Additional alkali metal oxides, including lithia, may be present with the total alkali metal oxide content normally in the range of 5–25% by weight. It is customary in glass formulation to provide at least one additional oxide component in alkali metal silicate glasses for increased chemical and thermal stability. In strengthening by a large-for-small ion exchange, it has been found that the oxides of aluminum and/or zirconium greatly enhance the strengthening characteristics of an alkali metal silicate glass. Such oxides are therefore generally preferred as the primary stabilizing oxide, usually in amounts of 5–25%. Optionally, the glass may further contain up to about 20% of other glassmaking materials, particularly $P_2O_5$, divalent metal oxides (e.g. PbO, CaO, MgO and BaO), $As_2O_3$, $Sb_2O_3$, colorant oxides and fluorine.

Melting and working of the glass form no critical part of the present invention and may be in accordance with known practice. Thus, a properly proportioned batch of commercially available raw materials may be melted in a crucible or continuous tank, depending on the melt size, at a maximum melting temperature within the range of 1300–1600° C. for a time of 6 to 16 hours. Exact melting conditions will depend on the particular glass composition and the quality or degree of homogeneity required in the ware. The article may be of any desired form including flat glass, cooking ware, serving dish, or container. However, the high temperature strength retention characteristics are particularly useful in baking ware, appliance components and the like involving elevated temperature service.

For test and developmental purposes, however, short lengths of quarter inch diameter glass cane or rod have been found to be particularly useful in determining strength and other characteristics attainable with different glass compositions and conditions of treatment. Also, the simple configuration of such an article lends itself to illustration. Therefore, the article aspect of the invention is schematically illustrated in FIGURE 1 of the accompanying drawing by a view in cross-section of a cylindrical rod or cane of glass.

The glass rod of FIGURE 1 is shown, for purposes of illustration and reference, as composed of three zones of glass. These include a central or core zone 10, an outer or surface zone 12, and an intermediate zone 14. Central or core zone 10 represents the parent alkali metal silicate glass from which the article is formed. Surface zone 12 represents the lithium silicate glass layer synthesized by the initial lithium for sodium ion exchange and modified by sodium ions occupying a portion of the lithium sites. Intermediate zone 14 indicates the parent alkali metal silicate glass from which lithium ions have migrated and into which sodium ions have migrated during the second heat treatment in accordance with the present invention.

The thicknesses of these zones represent depths within the glass and are distorted for purposes of illustration. In particular, surface zone 12 will normally be much shallower than can reasonably be indicated in the drawing. Further, compositions within the zones will not be constant but rather of a gradient nature so that the zones blend into one another.

In accordance with the method aspect of my invention, a preformed sodium silicate glass article is immersed in a molten lithium salt bath. Any lithium salt may be employed that is capable of being maintained in the molten state without appreciable decomposition at the temperature required for ion exchange purposes. This includes the nitrate, sulfate and halide lithium salts.

Frequently, a mixed salt bath is required in order to obtain the desired salt bath temperature; also, to minimize chemical etching or dissolution of either the container material or the glass itself. For temperatures ranging from 650–850° C., it has been found convenient to employ a combination of lithium and sodium sulfate salts within the range of 50–90% lithium sulfate and 10–50% sodium sulfate on a mole basis. The ion exchange rate normally increases with lithium ion content of a bath. Therefore, it is generally desirable to employ as high a proportion of lithium salt as feasible at a given operating temperature. For example, a combination of 75% lithium sulfate and 25% sodium sulfate is commonly used for exchange purposes at temperatures of about 750° C.

The depth to which lithium ions penetrate in exchange for sodium ions increases with increase in either the time of exchange or the temperature of the salt bath. At a given temperature, the depth of exchange varies directly with the square root of time in accordance with diffusion laws. The effect of temperature is such that an optimum depth of ion exchange for strengthening purposes may be attained in a minute or less at temperatures of about 750° C., whereas several hours may be required to attain a comparable depth at lower temperatures of about 600° C.

No critical depth or degree of lithium ion exchange can be established for present purposes, since some degree or nature of strengthening may be attained with any depth of ion exchange. Furthermore, the depth of exchange necessary for effective strengthening is largely dependent on the nature and depth of abrasion which will occur on the glass surface or to which the glass will be exposed. A depth of exchange in the range of two to four mils, equivalent to 0.05 to 0.10 mm., generally provides an optimum abraded strength. This may be conveniently attained by immersing a sodium silicate glass article in a lithium salt bath operating at a temperature in the range of about 700–800° C., and holding the glass in such bath at that temperature for a time ranging from a fraction of a minute up to about 30 minutes depending on the glass and temperature.

The exchange of lithium ions for sodium ions above the glass strain point produces a thin layer of glass that is different, both in structure and in composition, from the parent sodium silicate glass. This new glass is referred to as lithium silicate glass inasmuch as it substantially corresponds in composition to the parent glass except for an increase in lithium ion content and a corresponding decrease in sodium ion content, the total alkali metal oxide content on a molar basis being essentially the same in both glasses. Inasmuch as the exchange is above the glass strain point, the parent glass structure rearranges to accommodate the smaller lithium ion.

Figure 2:
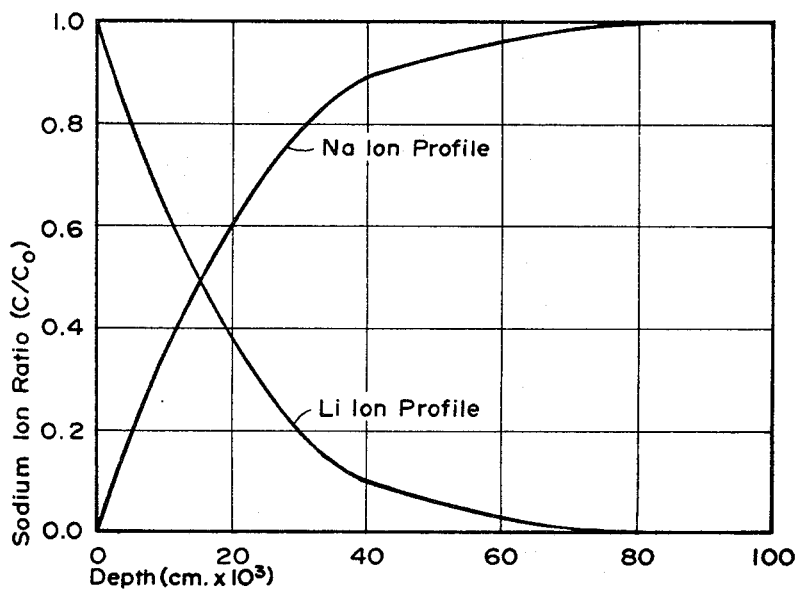

The manner in which the surface zone composition may vary is illustrated in FIGURE 2 which shows the sodium ion profile in a typical sodium aluminosilicate glass article subjected to a lithium ion exchange for 5 minutes under conditions such that the mutual ion diffusion rate is $10^{-6}$ cm.$^2$/sec. In the figure, the sodium ion ratio, $C/C_0$, is plotted along the vertical axis, while depth below the article surface (as indicated by the arrow in FIGURE 1) is plotted in thousandths of a centimeter along the horizontal axis. Sodium ion ratio is the ratio of sodium ion content at any given point to the sodium ion content of the parent glass prior to any exchange. It will be apparent that the lithium ion profile may be obtained by rotating the sodium ion profile 180° on the $$\frac{C}{C_0} = 0.5 \text{ axis}$$

and this is shown by the dotted line curve.

The glass article is now subjected to a further heat treatment at an elevated temperature below the transformation range. This temperature is such that the glass does not undergo sufficient viscous flow to permit rearrangement of the glass structure. Normally, this is below the glass strain point. The heat treatment need not be carried out in any particular medium or atmosphere. Accordingly, it is convenient to conduct the treatment in ordinary or ambient air in a kiln or other convenient form of heat treating equipment.

The time of heat treatment is dependent primarily on the temperature at which the treatment is carried out and the degree of internal ion exchange and consequent strengthening desired. It will be appreciated that any degree of reheating will result in some degree of internal ion exchange and consequent strengthening. However, as in ion exchange from an external source, the effective degree of exchange for strengthening purposes increases to an optimum in a relatively short time. Thereafter, further heat treatment is of little or no value.

The rate of exchange increases with temperature, and temperatures considerably above 200° C. are normally required. Preferably, the heat treatment is within a temperature range of 50–150° C. below the glass strain point. In this temperature range, times ranging from about 4 to about 16 hours are generally sufficient to approach the maximum strength attainable in a particular glass.

During this second heating step, the larger alkali metal ions in the parent glass, e.g. the exemplary sodium ions, counter diffuse from the parent glass in the central portion of the article toward and into the glass of the surface zone in exchange for lithium ions from this surface zone. However, because of the low temperature at which the exchange occurs, neither glass undergoes a structural rearrangement. Consequently, the sodium ions migrating into the surface zone occupy lithium ion sites in this glass. This develops compressive stresses within the surface which are balanced by tension in the interior, thereby resulting in increased mechanical strength in the glass article.

Figure 3:
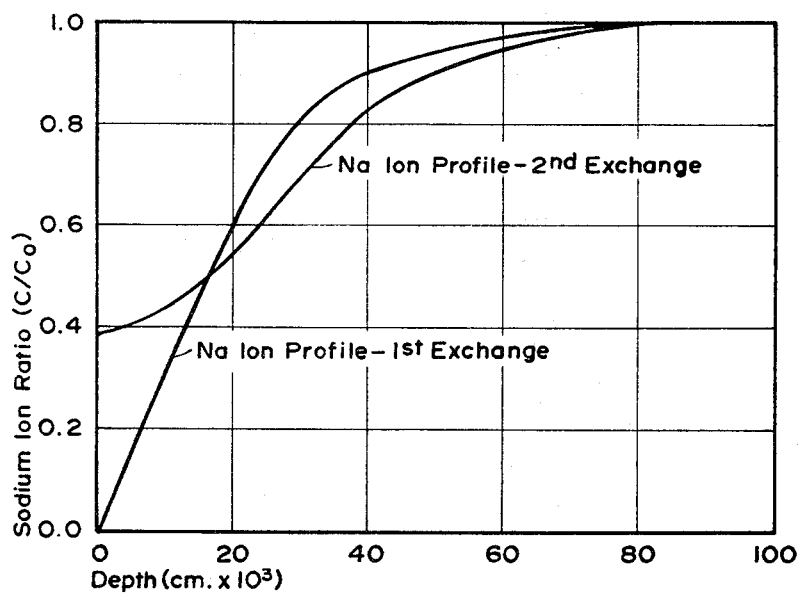

FIGURE 3 illustrates the manner in which the sodium ion concentration profile of FIGURE 2 is altered by the counter ion exchange that occurs during the heat treatment. In FIGURE 3, the sodium ion ratio, that is the ratio of sodium ion content after treatment to that in the original glass, is again plotted along the vertical axis and depth within the glass (in thousandths of a centimeter) is plotted along the horizontal axis. The plotted profile of sodium ion content is that in a typical sodium aluminosilicate glass heat treated for four hours at 450° C. after an initial lithium ion exchange as illustrated in FIGURE 2.

The nature of the invention, its practice, and the advantages resulting therefrom are further described and illustrated with respect to specific embodiments as follows:

EXAMPLE I

Quarter-inch diameter cane was drawn from a large crucible melt of a glass having the following formulation in percent by weight on an oxide basis: 50% $SiO_2$, 20% $Al_2O_3$, 10% $P_2O_5$, 18% $Na_2O$, 1% $K_2O$ and 1% $Li_2O$. This glass was melted from a batch of conventional raw materials in 16 hours at 1550° C., and had a measured strain point of 576° C. and a softening point of 860° C. The drawn cane was cut into four inch lengths for comparative ion exchange treatments and testing.

Initially, all of the lengths of cane were immersed for ten (10) minutes in a molten salt bath composed of 75 mole percent $Li_2SO_4$ and 25 mole percent $Na_2SO_4$, the bath being maintained at a temperature of 750° C. The test canes were then removed and cleaned prior to further treatment. The several test canes were now divided into groups and each group was inserted in a kiln for heating in air at a different temperature, all temperatures being below the glass strain point. During the heat treatment of each group, individual sets of six samples each were withdrawn so that the effect of varying the heat treatment time could be determined.

Following the air heat treatment, each cane sample of each set was subjected to a severe form of surface abrasion hereafter referred to as tumble abrasion. In this abrasive treatment, a set of ten cane samples was mixed with 200 cc. of 30 grit silicon carbide particles and subjected to a tumbling motion for 15 minutes in a Number 0 ball mill jar rotating at 90–100 r.p.m. Each tumble abraded cane sample was then mounted on spaced knife edges in a Tinius Olsen testing machine. A continuously increasing load was applied to the cane, intermediate of and opposite from the supporting knife edges, until the cane broke in flexure. From the measured load required to break each cane, a modulus of rupture (MOR) value was calculated for the individual cane and an average value determined for each sample set.

In the following table, individual samples sets are indicated in terms of temperature in degrees C. and the time of air heat treatment in hours. The table sets forth the average MOR value (in thousands of p.s.i.) for each set of samples so identified.

TABLE I

| Time (hrs.) | 525° C. | 450° C. |
|---|---|---|
| 0 | 27 | 27 |
| ½ | 31 | |
| 1 | 39 | 35 |
| 4 | 51 | 47 |
| 16 | 52 | 54 |
| 64 | 59 | 58 |
| 240 | 51 | 59 |

Similar MOR data, not presented here, were determined for corresponding sets of unabraded cane samples. In general, these values correlated closely with those presented above except that they were approximately 10–20% higher.

Figure 4:
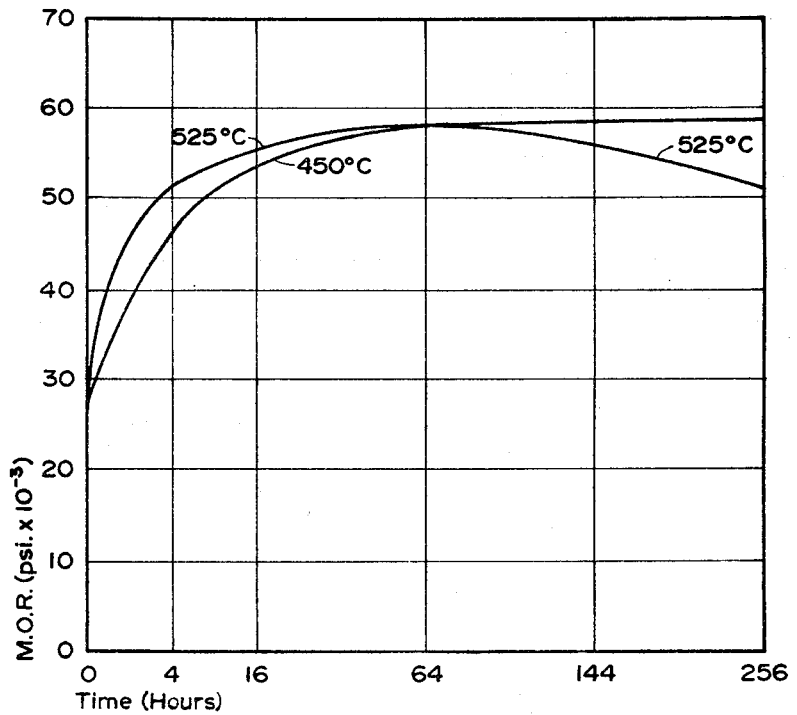

FIGURE 4 of the drawing is a graphical illustration which presents the data set forth in the table above. In this graphical illustration, MOR (in thousands of p.s.i.) is plotted on the vertical axis, while time in hours is plotted on the horizontal axis in a gradually increasing scale. Each of the curves based on this plotted data is identified by the temperature, in degrees C., of heat treatment to which the sample sets illustrated by the curve were subjected.

EXAMPLE 2

Sets of glass cane samples, corresponding generally to those described in Example 1, were prepared from a melt of glass having the following calcuated formulation in weight percent on an oxide basis: 72% $SiO_2$, 16% $ZrO_2$, 11% $Na_2O$ and 1% $Li_2O$.

Several sets of such cane samples were immersed in a molten salt bath composed of 80 mole percent $Li_2SO_4$ and 20 mole percent $Na_2SO_4$ and maintained in such bath for 15 minutes with the bath at a constant temperature of 720° C. After cooling and cleaning, the sets of cane samples were divided into two groups. One group was then heated in air at 450° C., while the other group was heated similarly at 550° C. Periodically, a set of samples was removed to permit comparing the variation in heat treatment. Each individual cane sample was then tumble abraded and broken in flexure as described in Example 1.

The following table sets forth the average MOR value (in thousands of p.s.i.) for each set of samples, the sample sets being identified in terms of the temperature and time of the air heat treatment in degrees C. and hours respectively.

TABLE II

| Time (hrs.) | 550° C. | 450° C. |
|---|---|---|
| 0 | 14 | 14 |
| 2 | 23 | 22 |
| 4 | 23 | 27 |
| 8 | 22 | 30 |

EXAMPLE 3

Glass cane samples, corresponding to those described in Example 1, were produced from a melt of a commercial window glass having the following approximate formulation in percent by weight on an oxide basis: 72% $SiO_2$, 12% $CaO$, 14% $Na_2O$ and 2% $Al_2O_3$.

These cane samples were immersed for one-half hour in a molten salt bath maintained at a temperature of 650° C. and composed of equal parts, on a mole basis, of lithium and sodium sulfates. After cooling and cleaning, the cane samples were divided into sets of six each and heated in air at 450° C., i.e. about 100° below the glass strain temperature. Each set was heated a different length of time, the longest time being 16 hours. The individual cane samples were then tumble abraded and broken in flexure in accordance with the practice of Example 1 to enable calculation of an average MOR value in thousands of p.s.i. for each set of samples. The average MOR increased from 9,000 p.s.i. with no reheat to 13,000 with 8 and 16 hours reheat respectively.

Thus, it is apparent that the present method of subsequent heat treatment is generally effective for strengthening alkali metal silicate type glasses. However, alumina and zirconia type glasses, as illustrated in Examples 1 and 2, are generally more receptive to this, as well as other types of chemical strengthening by ion exchange.

Numerous modifications and variations of the invention are readily apparent from the description and are contemplated within the scope of the claims that follow.

I claim:
1. A method for producing a glass article of high strength which comprises
   (1) contacting an alkali metal silicate glass article wherein the primary alkali metal ion is relatively large with a source of exchangeable alkali metal ions of relatively small ionic size at a temperature above the strain point of the glass for a period of time sufficient to replace at least part of said primary alkali metal ions with said smaller ions in a surface layer in the article;
   (2) cooling said glass article at least below the transformation range of the glass; and
   (3) heating said glass article out of contact with said source of exchangeable alkali metal ions at a temperature between about 200° C. and the transformation range of the glass for a period of time sufficient to replace at least part of said smaller ions in the surface layer with said primary alkali metal ions from the inner portion of the glass article.

2. A method in accordance with claim 1 wherein the primary alkali metal ion of the glass is sodium.

3. A method according to claim 2 wherein the glass article is heated out of contact with said source of exchangeable alkali metal ions at a temperature between about 50–150° C. below the strain point of the glass for about 4–16 hours.

4. An alkali silicate glass article of high mechanical strength containing ions of at least two alkali metals and having a surface compressive stress layer, an interior tensile stress portion, and an intermediate zone in which article the concentration of the larger alkali metal ions is greater in said interior portion than in said surface layer and in said intermediate zone, the concentration of the smaller alkali metal ions is greater in said surface layer than in said interior portion and in said intermediate zone, and the concentration of the larger and smaller metal ions varying in gradient fashion through said intermediate zone, the concentration of the smaller alkali metal ions being greater in that part of said zone bordering said surface layer and the concentration of the larger alkali metal ions being greater in that part of said zone bordering said interior portion of the glass article, said differences in concentration of larger and smaller alkali metal ions throughout the glass article creating said compressive stress.

5. An alkali silicate glass article in accordance with claim 4 wherein the larger alkali metal ion is selected from the group consisting of sodium, potassium, and mixtures thereof and the smaller alkali metal ion is lithium.

References Cited
UNITED STATES PATENTS 3,287,201  11/1966  Chisholm et al. _____ 65—30

DONALL H. SYLVESTER, *Primary Examiner.*

R. L. LINDSAY, *Assistant Examiner.*